United States Patent
Chen

(10) Patent No.: US 9,472,037 B2
(45) Date of Patent: Oct. 18, 2016

(54) MEDIA ITEM RE-ORIENTATION

(71) Applicant: NCR Corporation, Duluth, GA (US)

(72) Inventor: Ping Chen, Beijing (CN)

(73) Assignee: NCR CORPORATION, Duluth, GA (US)

( * ) Notice: Subject to any disclaimer, the term of this patent is extended or adjusted under 35 U.S.C. 154(b) by 50 days.

(21) Appl. No.: 14/169,692

(22) Filed: Jan. 31, 2014

(65) Prior Publication Data

US 2015/0221155 A1    Aug. 6, 2015

(51) Int. Cl.
| | |
|---|---|
| *G07D 7/20* | (2016.01) |
| *G06T 3/60* | (2006.01) |
| *G07D 7/12* | (2016.01) |
| *G06T 7/00* | (2006.01) |
| *G06K 9/32* | (2006.01) |

(52) U.S. Cl.
CPC ........... *G07D 7/2008* (2013.01); *G06K 9/3275* (2013.01); *G06T 3/608* (2013.01); *G06T 7/0042* (2013.01); *G07D 7/121* (2013.01); *G07D 7/128* (2013.01)

(58) Field of Classification Search
None
See application file for complete search history.

(56) References Cited

U.S. PATENT DOCUMENTS

| | | | | |
|---|---|---|---|---|
| 5,369,714 A | * | 11/1994 | Withgott et al. | 382/177 |
| 5,613,016 A | * | 3/1997 | Saitoh | 382/174 |
| 8,162,125 B1 | * | 4/2012 | Csulits et al. | 194/206 |
| 2006/0054454 A1 | * | 3/2006 | Oh | G06M 7/06 194/207 |
| 2006/0098243 A1 | * | 5/2006 | Ahmed et al. | 358/474 |
| 2009/0252437 A1 | * | 10/2009 | Li et al. | 382/289 |
| 2009/0324043 A1 | * | 12/2009 | Sun | G06T 7/0028 382/131 |
| 2010/0164781 A1 | * | 7/2010 | Boyer et al. | 342/165 |
| 2011/0052094 A1 | * | 3/2011 | Gao et al. | 382/296 |
| 2013/0343652 A1 | * | 12/2013 | Goto et al. | 382/182 |

OTHER PUBLICATIONS

Cao et al. "Skew detection and correction in document images based on striaght-line fitting." Pattern Recognition Letters 2003.*

* cited by examiner

*Primary Examiner* — Sean Motsinger
(74) *Attorney, Agent, or Firm* — Schwegman, Lundberg & Woessner

(57) ABSTRACT

The present invention provides a method of re-orienting an image of a media item, comprising determining at least one linear array formed by a plurality of locations associated with an image of the media item; determining a skew angle of said linear array with respect to a reference axis; and re-orienting said image by rotating said image responsive to said skew angle. Apparatus for re-orienting an image of a media item and a document processing module are also provided.

15 Claims, 3 Drawing Sheets

MEDIA ITEM RE-ORIENTATION

FIELD OF THE INVENTION

The present invention relates to media item imagery for the purposes of validation, counterfeit detection and/or denomination recognition. In particular, but not exclusively, the present invention relates to re-orienting an image of a media item for effective validation, counterfeit detection and/or denomination recognition purposes.

Various situations are known in which media items are transported along different transport pathways in a Self-Service Terminal (SST). In a typical SST, such as a banknote depositing Automated Teller Machine (ATM), an ATM customer is allowed to deposit one or more banknotes (without having to place a banknote in a deposit envelope) in a publicly accessible, unattended environment. To deposit a banknote, the ATM customer inserts an identification card through a card slot at the ATM, enters the total value of banknotes being deposited, and inserts the banknote to be deposited through a deposit slot of a banknote acceptor. A transport mechanism receives the inserted banknote and transports the banknote in a forward direction along an infeed transport path to a number of locations within the ATM to process the banknote. One such location includes a validator which examines the banknote, or similar media item such as checks, vouchers, coupons, or the like, for a number of purposes, including denomination recognition, counterfeit detection, banknote identification, and the like.

A conventional validator includes a transport mechanism for transporting a banknote along a transport path, a camera located on one side of the transport path to take an image of the banknote and an LED array located on the other side of the transport path for illuminating the banknote. A problem exists when the banknote enters the validator at an angle to the transport path such that the image taken of the banknote is skewed with respect to the camera. This can cause errors in the validation process, denomination recognition and/or counterfeit examination. A rough banknote de-skew process is known. However, this known process depends on the banknote detection and the skewed angled level. If there is degradation of the banknote boundary edge or other similar boundary background disturbances/noise, or the skewed angle is larger than its tolerance, the de-skew result observed may not be accurate.

SUMMARY OF THE INVENTION

It is an aim of certain embodiments of the present invention to at least partly mitigate the above-mentioned problems.

It is an aim of certain embodiments of the present invention to provide an accurate, reliable, automatic and simple method of detecting a skewed media item image and re-orienting the image for effective banknote validation/recognition purposes.

It is an aim of certain embodiments of the present invention to provide a method of detecting a skewed media item image which is only dependent on the serial number on the media item, without requiring any prior knowledge of boundary edge degradation or similar boundary edge/background disturbance/noise.

According to a first aspect of the present invention there is provided a method of re-orienting an image of a media item, comprising:
determining at least one linear array formed by a plurality of locations associated with an image of a media item;
determining a skew angle of said linear array with respect to a reference axis; and
re-orienting said image by rotating said image responsive to said skew angle.

Aptly, the method further comprises:
identifying a plurality of associated letters and/or numerals in the image of the media item; and
identifying the plurality of locations associated with the image by determining at least one location associated with each letter or numeral.

Aptly, the method further comprises:
identifying an area of said image associated with said letters and/or numerals;
determining adjacent pairs of black and white locations in said area, each pair comprising a black location associated with a letter or numeral and a white location associated with a background on which the letters and/or numerals are disposed; and
identifying the plurality of locations forming a linear array by identifying the black locations of the adjacent pairs of black and white locations which at least partially form a common edge of said letters and/or numerals.

Aptly, the method further comprises:
identifying an x,y coordinate for each of said plurality of locations; and
applying a linear transform algorithm to each x,y coordinate to determine the at least one linear array formed by said plurality of locations.

Aptly, the method further comprises:
determining at least a pair of polar coordinates r,θ associated with the at least one linear array according to:

$r = x \cos \theta + y \sin \theta$ wherein:
r is a distance between the linear array and a reference origin;
θ is an angle of a vector from the reference origin to the linear array; and $$y = \left(-\frac{\cos \theta}{\sin \theta}\right)x + \left(\frac{r}{\sin \theta}\right)$$

Aptly, a serial number of said media item comprises the plurality of letters and/or numerals.

Aptly, each of the plurality of locations is associated with a respective one of the plurality of letters and/or numerals of said serial number and the linear array is aligned with a boundary of said serial number.

Aptly, the method further comprises:
identifying said plurality of locations by associating each of said plurality of locations with at least one pixel of said image.

Aptly, the method further comprises:
identifying said plurality of locations by reading image data associated with each of said plurality of locations.

Aptly, said image is a two-dimensional image and said reference axis is an x-axis of said image.

Aptly, the plurality of locations are located within a perimeter edge of said media item.

Aptly, the media item is a financial media item, such as a currency note or check.

According to a second aspect of the present invention there is provided apparatus for re-orienting an image of a media item, comprising:

an optical imager for obtaining an image of a media item; and a processor to determine at least one linear array formed by a plurality of locations associated with the image, to determine a skew angle of said linear array with respect to a reference axis, and to re-orient said image by rotating said image responsive to said skew angle.

According to a third aspect of the present invention there is provided a document processing module comprising apparatus according to the second aspect of the present invention.

According to a fourth aspect of the present invention there is provided a Self-Service Terminal (SST) comprising a document processing module according to the third aspect of the present invention.

According to a fifth aspect of the present invention there is provided a method of re-orienting an image of a media item, comprising:

determining a skew angle of an image of a media item dependent on a detected position of a plurality of letters and/or numbers of said media item; and rotating said image responsive to said skew angle.

According to a sixth aspect of the present invention there is provided a method of re-orienting an image of a financial media item, comprising:

determining at least one linear array formed by a plurality of locations associated with an image of a financial media item;

determining a skew angle of said linear array with respect to a reference axis; and re-orienting said image by rotating said image responsive to said skew angle.

According to a seventh aspect of the present invention there is provided apparatus for re-orienting an image of a financial media item, comprising:

an optical imager for obtaining an image of a financial media item; and a processor to determine at least one linear array formed by a plurality of locations associated with the image, to determine a skew angle of said linear array with respect to a reference axis, and to re-orient said image by rotating said image responsive to said skew angle.

According to an eighth aspect of the present invention there is provided a product which comprises a computer program comprising instructions for re-orienting an image of a media item via the steps of:

determining at least one linear array formed by a plurality of locations associated with an image of a media item;

determining a skew angle of said linear array with respect to a reference axis; and re-orienting said image by rotating said image responsive to said skew angle.

Certain embodiments of the present invention may provide a method and apparatus for accurately and reliably detecting and re-orientating a skewed media item prior to denomination recognition and/or genuine/counterfeit/suspect validation.

Certain embodiments of the present invention may provide a method and apparatus for automatically and simply detecting and re-orientating a skewed media item prior to denomination recognition and/or genuine/counterfeit/suspect validation.

Certain embodiments of the present invention may provide a method and apparatus for detecting and re-orientating a skewed media item which only requires a front media item image from any one of a number of reflection channels.

Certain embodiments of the present invention may provide a method and apparatus for detecting and re-orientating a skewed media item which does not require any pre-processing such as boundary detection, edge cropping, re-size image resolution, or the like.

BRIEF DESCRIPTION OF DRAWINGS

Embodiments of the present invention will now be described hereinafter, by way of example only, with reference to the accompanying drawings in which.

DESCRIPTION OF EMBODIMENTS

Figure 1:
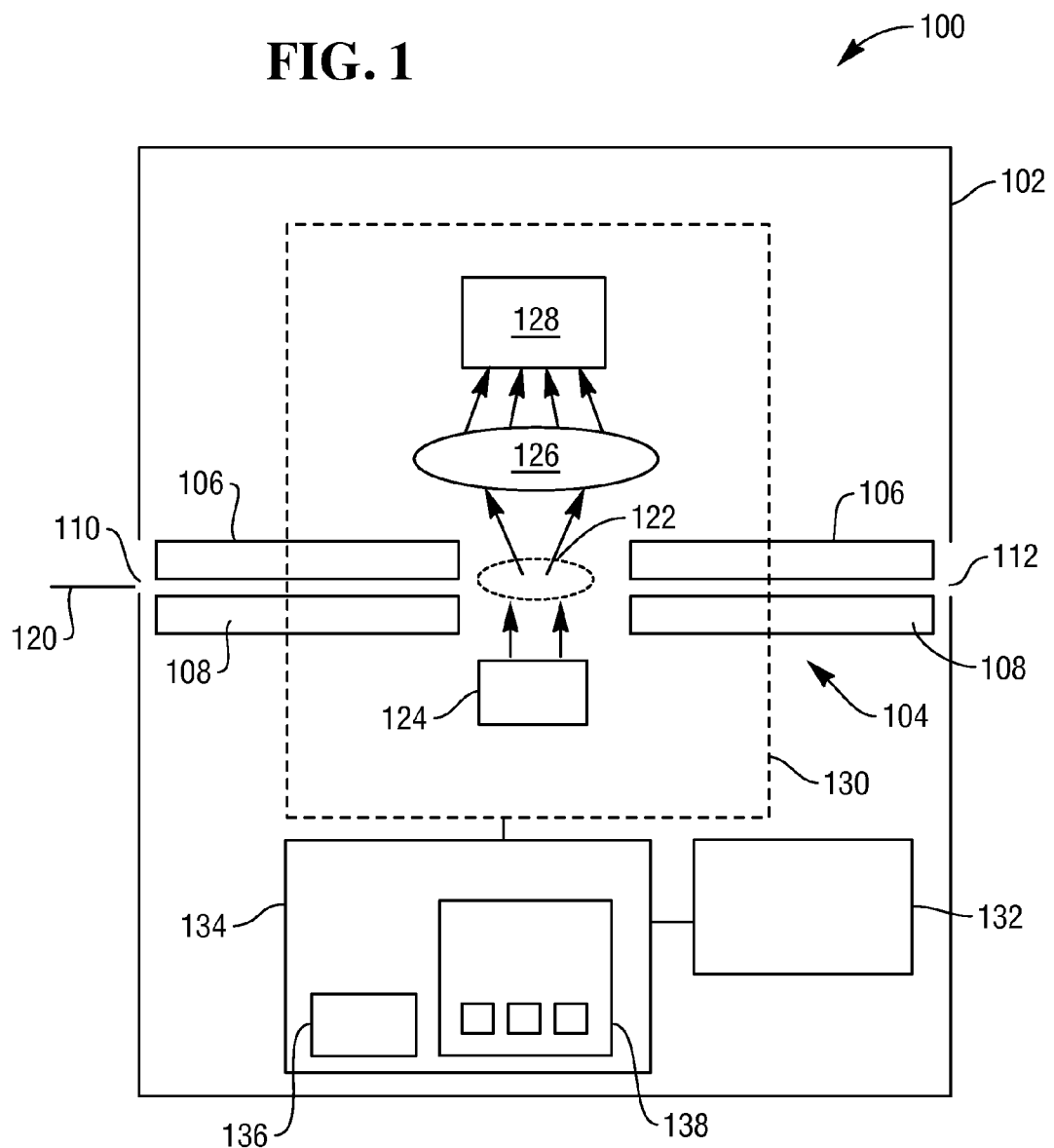
FIG. 1 illustrates a schematic diagram of a banknote validator for implementing a method of aligning an image of a financial media item, such as a banknote or check, inserted therein, according to one embodiment of the present invention.

In the drawings like reference numerals refer to like parts.

FIG. 1 illustrates a media item validator 100 (in the form of a banknote validator) for implementing, inter alia, a method of re-orienting a banknote according to one embodiment of the present invention.

The banknote validator 100 includes a housing 102 which supports a transport mechanism 104 in the form of a train of pinch rollers 106, 108 extending from an entrance port 110 to a capture port 112. The pinch rollers include upper pinch rollers 106 aligned with and spaced apart from lower pinch rollers 108.

The entrance and capture ports 110, 112 are in the form of apertures defined by the housing 102. In use, the capture port 112 would typically be aligned with parts of a depository module.

In use, the pinch rollers 106, 108 guide a financial media item (in this embodiment a banknote) 120 short edge first through an examination area 122 defined by a gap between adjacent pinch roller pairs. While the banknote 120 is being conveyed through the examination area 122, the banknote 120 is illuminated selectively by illumination sources, including a lower linear array of infrared LEDs 124 arranged to illuminate across the short edge of the bank note 120. The infrared LEDs 124 are used for transition measurements. Additional illumination sources are provided for other functions of the banknote validator 100 (for example, banknote identification, counterfeit detection, and the like), but these are not relevant to this invention so will not be described herein.

When the infrared LEDs 124 are illuminated, the omitted infrared radiation is incident on an underside of the banknote 120 and an optical lens 126 focuses light transmitted through the banknote 120 to the optical imager 128 (in this embodiment a CCD Contact Image Sensor (CIS)). This provides a transmitted infrared channel output from the optical imager 128. In this embodiment, the optical imager comprises an array of elements, each element providing an 8-bit value of detected intensity. The CIS 128 in this embodiment is a 200 dots per inch sensor but the outputs are averaged, in this embodiment, so that 25 dots per inch are provided.

The illumination source 124, lens 126 and imager 128 comprise an image collection component 130.

Figure 2:
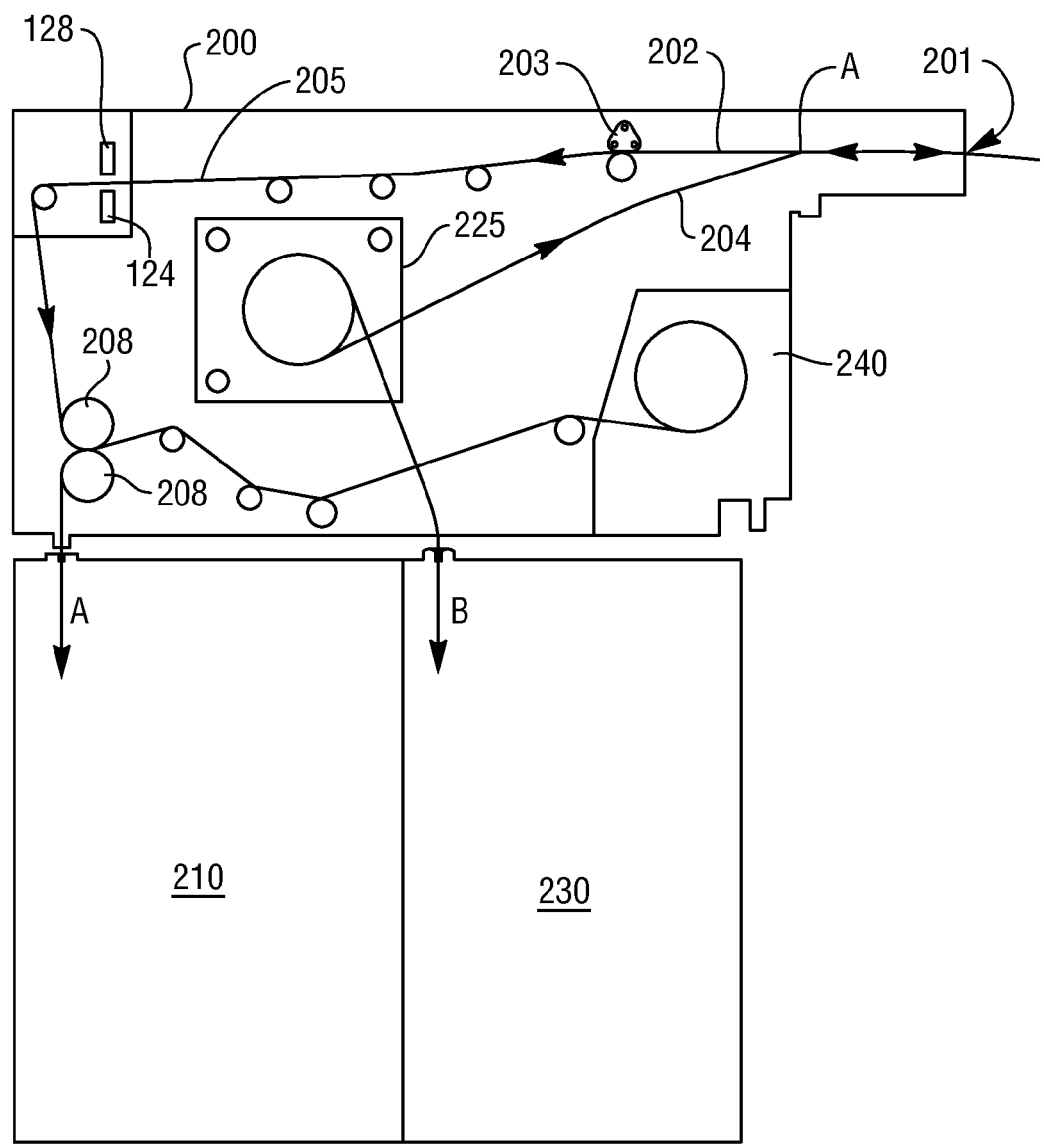
FIG. 2 illustrates a document processing module including the banknote validator of FIG. 1.

The banknote validator 100 includes a data and power interface 132 for allowing the banknote validator 100 to transfer data to an external unit, such as an ATM (as shown in FIG. 2), a media depository (not shown), or a computer (not shown), and to receive data, commands, and power therefrom. The banknote validator 100 will typically be incorporated into a media depository, which would typically be incorporated into an ATM.

The banknote validator 100 also includes a controller 134 including a Digital Signal Processor (DSP) 136 and an associated memory 138. The controller 134 controls the pinch rollers 106, 108 and the image collection components 130 (including energizing and de-energizing the illuminating source 124). The controller 134 also collates and processes data captured by the image collection component 130, and communicates this data and/or results of any analysis of this data to the external unit via the data and power interface 132. The controller 134 receives the infrared transmission data from the optical imager 128.

As illustrated in FIG. 2, a document processing module 200 has an access mouth 201 through which incoming checks and/or banknotes are deposited or outgoing checks are dispensed. This mouth 201 is aligned with an infeed aperture in the ATM. A bunch of one or more banknotes or checks is input or output via the infeed aperture of the ATM. Aptly, a bunch of a hundred items or more can be received/dispensed. Incoming banknotes or checks follow a first transport path 202 away from the mouth 201 in a substantially horizontal direction from right to left as shown in FIG. 2. The first transport path 202 is also referred to as the infeed path. The banknotes or checks then pass through a feeder/separator 203 and along another pathway portion 205 which is also substantially horizontal and right to left. The banknotes or checks then individually enter the validator module of FIG. 1 which includes the LEDs 124 and imager 128.

The checks or banknotes are then directed substantially vertically downwards to a point between two nip rollers 208. These nip rollers co-operate and are rotated in opposite directions with respect to each other to either draw deposited checks or banknotes inwards (and urge those checks towards the right hand side in FIG. 2), or during another mode of operation, the rollers can be rotated in an opposite fashion to direct processed checks or banknotes downwards in the direction shown by arrow A in FIG. 2 into a check bin 210. Incoming checks or banknotes which are moved by the nip rollers 208 towards the right can either be diverted upwards (in FIG. 2) into a re-buncher unit 225, or downwards in the direction of arrow B in FIG. 2 into a cash bin 230, or to the right hand side shown in FIG. 2 into an escrow 240. Checks or banknotes from the escrow can be directed to the re-buncher 225 or downwards into the cash bin 230. Checks or banknotes can be reprocessed or returned to a customer via a further transport path 204, also known as the return path.

Figure 3:
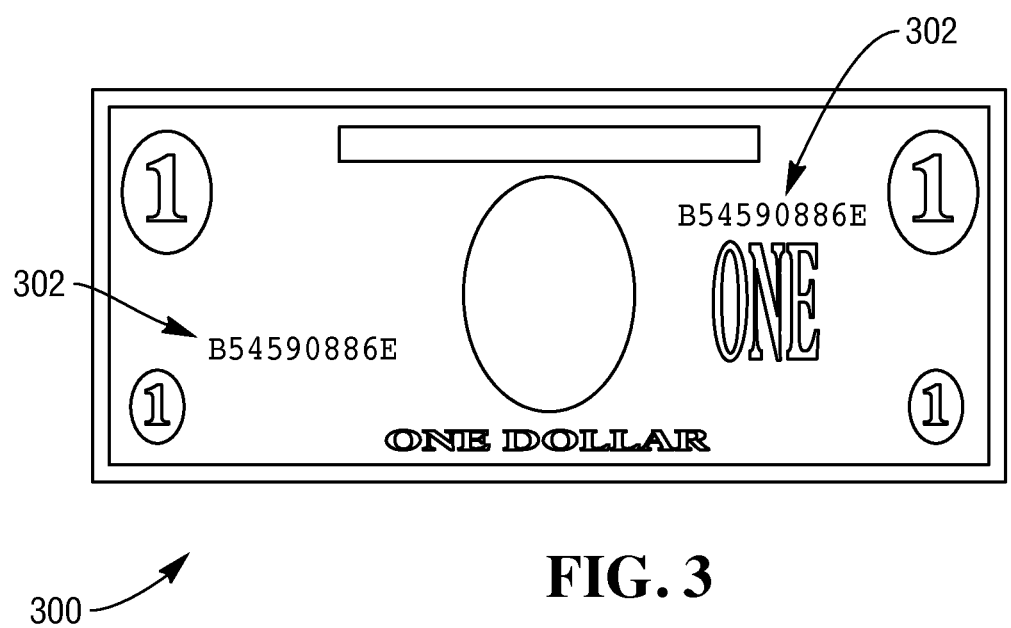
FIG. 3 illustrates a skewed one dollar banknote.

In accordance with certain embodiments of the present invention, the imager 128 obtains a digital 2D image 300 of a banknote 120 located on the transport path 205. A skewed image of a one dollar banknote 120 is shown in FIG. 3. The processor identifies pixels of the obtained image which are associated with letters/numerals of a serial number 302 on the banknote 120. The processor binarises' a portion of the image containing the serial number based on black and white pixels of the image and determines the black pixels forming the image of the serial number. A linear array of black pixels associated with the serial number is then identified and used to determine a skew angle of the serial number and, in turn, the bank note with respect to a predetermined reference axis.

Figure 4:
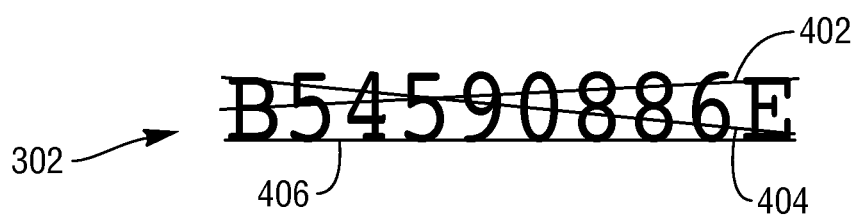
FIG. 4 illustrates a serial number of the banknote of FIG. 3.

However, each pixel forming the banknote image can lie on an infinite number of lines and many lines with different angles through the letters/numerals of the serial number can be identified, such as lines 402, 404 as shown in FIG. 4. Therefore, to reduce processing time and capacity, a portion of the image including the serial number of the banknote is binarised in terms of black and white pixel pairs to determine which pixels lie on the relatively dark numbers/numerals of the serial number and which relatively white pixels lie on the relatively light background of the banknote itself. The linear transform then only concentrates on the black pixels located at a lower boundary of the serial number and, as the serial number is made up of all capital letters or figures, the lowermost pixels of the serial number can be used as a reference line 406.

The linear Hough transform algorithm uses a two-dimensional array, called an accumulator, to detect the existence of a line described by:

$$r = x \cos \theta + y \sin \theta \quad (1)$$

The dimension of the accumulator equals the number of unknown parameters, i.e. two, considering quantized values of r and $\theta$ in the pair $(r,\theta)$. For each black pixel of the serial number at $(x,y)$, the Hough transform algorithm determines if there is enough evidence of a straight line at that pixel. If so, it will calculate the parameters $(r,\theta)$ of that line, and then look for the accumulator's bin that the parameters fall into, and increment the value of that bin. By determining the bins with the highest values, typically by looking for local maxima in the accumulator space, the most likely lines can be extracted, and their (approximate) geometric definitions read off. The simplest way of finding these peaks is by applying a form of threshold, but other techniques may yield better results in different circumstances—determining which lines are found as well as how many.

Since the lines returned do not contain any length information, it is often necessary, in the next step, to find which parts of the image match up with which lines. Each point $(x,y)$ will lie on the reference line 406 if the point $(x,y)$ is black and a lower neighboring point $(x,y+1)$ is white. Moreover, due to imperfection errors in the edge detection step, there will usually be errors in the accumulator space, which may make it non-trivial to find the appropriate peaks, and thus the appropriate lines. The final result of the linear Hough transform is a two-dimensional array (matrix) similar to the accumulator—one dimension of this matrix is the quantized angle $\theta$ and the other dimension is the quantized distance r. Each element of the matrix has a value equal to the number of pixels that are positioned on the line represented by quantized parameters $(r,\theta)$. So the element with the highest value indicates the straight line that is most represented in the input image.

Once a skew angle $\theta$ of the reference line associated with a lower boundary of the serial number is determined, the banknote image can be rotated relative to the predetermined reference axis to re-orient the image for effective validation/recognition purposes.

Thus, certain embodiments of the present invention may provide a method and apparatus for automatically, simply, reliably and accurately detecting and re-orienting a skewed financial media item prior to denomination recognition and/or genuine/counterfeit/suspect validation.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method of re-orienting an image of a media item, comprising:
    determining at least one linear array formed by a plurality of locations associated with an image of a media item, wherein determining further includes obtaining at least a portion of the image from an array of infrared Light Emitting Diodes that illuminate across an edge of the media item, wherein each of the plurality of locations is associated with one of a plurality of letters or numerals of a serial number present in the image of the media item, and aligning the at least one linear array with a boundary of the serial number;
    determining a skew angle of said linear array with respect to a reference axis by concentrating on black pixels located on a lower boundary of the serial number present in the image of the media item as a reference, and determining the skew angle is based only on processing those portions of the media image having the serial number; and
    re-orienting said image by rotating said image responsive to said skew angle and providing the re-oriented image to a media item validator for counterfeit determination of the media item.

2. The method as claimed in claim 1, further comprising:
    identifying a plurality of associated letters and/or numerals in the image of the media item; and
    identifying the plurality of locations associated with the image by determining at least one location associated with each letter or numeral.

3. The method as claimed in claim 2, further comprising:
    identifying an area of said image associated with said letters and/or numerals;
    determining adjacent pairs of black and white locations in said area, each pair comprising a black location associated with a letter or numeral and a white location associated with a background on which the letters and/or numerals are disposed; and
    identifying the plurality of locations forming a linear array by identifying the black locations of the adjacent pairs of black and white locations which at least partially form a common edge of said letters and/or numerals.

4. The method as claimed in claim 1, further comprising:
    identifying an x,y coordinate for each of said plurality of locations; and
    applying a linear transform algorithm to each x,y coordinate to determine the at least one linear array formed by said plurality of locations.

5. The method as claimed in claim 4, further comprising:
    determining at least a pair of polar coordinates r,θ associated with the at least one linear array according to:

$r = x \cos \theta + y \sin \theta$ wherein:
    r is a distance between the linear array and a reference origin;
    θ is an angle of a vector from the reference origin to the linear array; and $$y = \left(-\frac{\cos \theta}{\sin \theta}\right)x + \left(\frac{r}{\sin \theta}\right)$$

6. The method as claimed in claim 2, wherein the serial number of said media item comprises the plurality of letters and/or numerals.

7. The method as claimed in claim 6, wherein each of the plurality of locations is associated with a respective one of the plurality of letters and/or numerals of said serial number and the linear array is aligned with a boundary of said serial number.

8. The method as claimed in claim 1, further comprising:
    identifying said plurality of locations by associating each of said plurality of locations with at least one pixel of said image.

9. The method as claimed in claim 1, further comprising:
    identifying said plurality of locations by reading image data associated with each of said plurality of locations.

10. The method as claimed in claim 1, wherein said image is a two-dimensional image and said reference axis is an x-axis of said image.

11. The method as claimed in claim 1, wherein the plurality of locations are located within a perimeter edge of said media item.

12. The method as claimed in claim 1, wherein the media item is a banknote or check.

13. Apparatus for re-orienting an image of a media item, comprising:
    an optical imager for obtaining an image of a media item, wherein at least a portion of the image obtained from an array of infrared Light Emitting Diodes that illuminate across an edge of the media item; and
    a processor to determine at least one linear array formed by a plurality of locations associated with the image, wherein each of the plurality of locations is associated with one of a plurality of letters or numerals of a serial number present in the image of the media item, and aligning the at least one linear array with a boundary of the serial number, and the processor to determine a skew angle of said linear array with respect to a reference axis by concentrating on black pixels located on a lower boundary of the serial number present in the image of the media item as a reference, wherein determination of the skew angle is based only on processing those portions of the image having the serial number, to re-orient said image by rotating said image responsive to said skew angle, and to provide the re-oriented image to a media validator for counterfeit determination of the media item.

14. A document processing module comprising apparatus as claimed in claim 13.

15. A method of re-orienting an image of a media item, comprising:

determining a skew angle of an image of a media item dependent on a detected position of a plurality of letters and/or numbers of said media item present in a serial number of the media time by concentrating on black pixels located on a lower boundary of the serial number present in the image of the media item as a reference, wherein determining further includes obtaining at least a portion of the image from an array of infrared Light Emitting Diodes that illuminate across an edge of the media item, and wherein determination of the skew angle is based only on processing those portions of the image having the serial number; and rotating said image responsive to said skew angle; and providing the rotated image to a media validator for counterfeit determination of the media item.

* * * * *